US012208971B2

(12) United States Patent
Biondi et al.

(10) Patent No.: US 12,208,971 B2
(45) Date of Patent: Jan. 28, 2025

(54) MOVEMENT UNIT FOR ARTICLES

(71) Applicant: G.D S.P.A., Bologna (IT)

(72) Inventors: Andrea Biondi, Bologna (IT); Luca Cavazza, Bologna (IT); Umberto Zanetti, Bologna (IT); Enrico Campagnoli, Bologna (IT); Antonio Gigante, Bologna (IT); Giacomo Noferini, Bologna (IT)

(73) Assignee: G.D S.P.A., Bologna (IT)

( * ) Notice: Subject to any disclaimer, the term of this patent is extended or adjusted under 35 U.S.C. 154(b) by 0 days.

(21) Appl. No.: 17/998,245

(22) PCT Filed: Jul. 26, 2021

(86) PCT No.: PCT/IB2021/056706
§ 371 (c)(1),
(2) Date: Nov. 8, 2022

(87) PCT Pub. No.: WO2022/023923
PCT Pub. Date: Feb. 3, 2022

(65) Prior Publication Data
US 2023/0192419 A1    Jun. 22, 2023

(30) Foreign Application Priority Data
Jul. 31, 2020   (IT) .................. 102020000018790

(51) Int. Cl.
*B65G 47/84*    (2006.01)
*B65B 29/02*    (2006.01)
(Continued)

(52) U.S. Cl.
CPC .......... *B65G 47/846* (2013.01); *B65B 29/022* (2017.08); *B65B 43/46* (2013.01);
(Continued)

(58) Field of Classification Search
CPC ...... B65G 47/846; B65G 47/71; B65G 29/00; B65B 29/022; B65B 43/46; B65B 43/54; B65B 65/006; B65B 39/145
(Continued)

(56) References Cited

U.S. PATENT DOCUMENTS 8,465,274 B2 * 6/2013 Borgatti .................. B29C 49/36
425/540
8,739,959 B2 * 6/2014 Breil ...................... B21D 43/14
198/470.1
(Continued)

FOREIGN PATENT DOCUMENTS

| DE | 2615007 A1 * | 10/1977 | |
| DE | 19935266 A1 * | 2/2001 | ......... B29C 49/4215 |
| EP | 3040285 A1 * | 7/2016 | ............. B65B 29/02 |

OTHER PUBLICATIONS

International Search Report and Written Opinion for International Application No. PCT/IB2021/056706 filed on Jul. 26, 2021 on behalf of G.D S.P.A. Mail Date: Nov. 2, 2021 14 pages.

*Primary Examiner* — Gene O Crawford
*Assistant Examiner* — Muhammad Awais
(74) *Attorney, Agent, or Firm* — Steinfl + Bruno LLP

(57) ABSTRACT

A movement unit for articles includes a first carousel device having a first transporter member and first gripping heads mounted thereon and provided to move the articles into a single-row configuration. The movement unit further includes a second carousel device to receive the articles from the first carousel device, having a second transporter member and second gripping heads mounted thereon. Each second gripping head is configured to receive the articles from a respective first gripping head and to move the articles into a multi-row configuration.

16 Claims, 3 Drawing Sheets

(51) Int. Cl.
  *B65B 43/46*  (2006.01)
  *B65B 43/54*  (2006.01)
  *B65B 65/00*  (2006.01)
  *B65G 47/71*  (2006.01)

(52) U.S. Cl.
  CPC ............ *B65B 43/54* (2013.01); *B65B 65/006* (2013.01); *B65G 47/71* (2013.01)

(58) Field of Classification Search
  USPC .................................. 198/480.1, 441, 459.2
  See application file for complete search history.

(56) References Cited

U.S. PATENT DOCUMENTS

2002/0093126 A1* 7/2002 Choinski ........... B29C 49/42122
                     425/534
2010/0058716 A1* 3/2010 Leykamm ............. B65C 9/1819
                     53/111 R

* cited by examiner

MOVEMENT UNIT FOR ARTICLES

CROSS REFERENCE TO RELATED APPLICATIONS

The present application is the US National Stage of International Patent Application No. PCT/IB2021/056706, filed on Jul. 26, 2021, which in turn, claims priority to Italian Application No. IT 102020000018790, filed on Jul. 31, 2020.

The present invention relates to a movement unit in which the passage of articles between carousel devices is eased. It is also directed to a method for moving articles between carousel devices.

The present invention finds a preferred, though not exclusive, application in the field for preparing and packaging food and non-food products, an example of which is represented by the capsules for infusion type beverages, e.g. coffee, a product to which reference will be made below without loss of generality.

In particular, in this technical field, production and packaging apparatuses are known in which a plurality of containers are individually filled with the product to be packaged, e.g. coffee powder, and then, after being closed by a special membrane, are packaged in special boxes and sent to the final packaging step.

Along this production and packaging apparatus, the containers are moved between subsequent processing units in which they undergo various operations such as the union with a filter that encloses the powder of the infusion type beverage (for example coffee powder), the filling with such powder and the final closure of the container with a membrane.

The containers can be moved between the different processing units by means of transport devices of different type, of which the carousel devices are particularly important due to their widespread use.

In this description as well as in the accompanying claims, certain terms and expressions are deemed to have, unless otherwise expressly indicated, the meaning expressed in the following definitions.

The term "article" means any object apt to be moved between subsequent processing units by means of a carousel device.

The articles can be identical to each other, or they can differ from each other in some characteristics such as the formation, the composition or the colour. "Carousel device" means a transport device for articles, comprising a transporter member, which is moved along a closed path thus defining an advance trajectory for the articles, and a plurality of gripping heads, which are mounted on the transporter member with an ability to move with respect thereto.

The transporter member can be a drum which rotates about a main rotation axis, so as to define a circular advance trajectory, or it can assume different configurations.

The gripping heads are intended to retain the articles as they move along the advance path between a loading zone and an unloading zone of the articles. For this purpose, the gripping heads can be provided with elements specifically provided to individually retain the articles, such as gripping elements of the pincer or suction cup type, or, again, tray-like elements on which respective seats are obtained to receive the articles individually.

The gripping heads are constrained to the transporter member but are limitedly movable with respect thereto. The relative movement of the gripping heads with respect to the transporter member can be of the rotary, translational type or any combination of these movements.

A plurality of articles is moved by a carousel device in a "single-row" configuration when the articles that are moved by the carousel device form only one row during the movement thereof along the advance path of the transporter device.

In other words, all the articles are moved by the carousel device along the same trajectory, which, preferably, is substantially parallel with the advance trajectory of the transporter member, except for the relative movements of the gripping heads.

Similarly, a plurality of articles is moved by a carousel device in a "multiple-row" configuration when the articles that are moved by the carousel device form two or more rows that are staggered from each other during the movement thereof along the advance trajectory of the transporter member.

In this case, therefore, the articles are moved by the carousel device in different groups, with each group of articles following the same trajectory. Preferably, each trajectory followed by the different groups of articles is substantially parallel with the advance trajectory of the transporter member, except for the relative movements of the gripping heads.

The Applicant has preliminarily observed that the carousel devices are particularly suitable in production processes that require continuous processing, in particular with high production capacity.

In particular, the Applicant has verified that these devices can be advantageously provided with suitable processing moving elements which can perform a desired operation on the articles while the latter are retained by the gripping heads and moved along the advance trajectory.

The Applicant has further observed that the transporter member of the carousel devices, also in order to keep the overall dimensions down, is conducted along a closed loop path, which is often circular.

However, the Applicant has found that under certain conditions this shape may involve some drawbacks which can limit the production capacity of the processing unit or potentially damage the articles themselves.

An example of such conditions could be in the case in which the articles being transported on the carousel device were open containers that are filled with a product that, under the action of the centrifugal force, might spill out of the container, such as the containers filled with a liquid or powdered material, such as coffee powder.

The Applicant has, however, observed that such a situation may arise both when the carousel device is used as a simple device for transporting articles and when it is used as a unit for continuous processing of the articles.

In the first case, in fact, a request for greater production capacity generally results in a higher angular speed of the device and, consequently, a greater centrifugal force acting on the articles that are moved by the carousel device. In the second case, in fact, in order to meet the request for high production capacity and considering that the time for moving the articles on the carousel device substantially depends on the type of processing to be carried out and is therefore in some way predefined, the carousel device is provided with a large number of processing moving elements which are arranged next to each other.

In order to allow more moving elements to be installed on the carousel device, however, the Applicant has noted that the diameter of the transporter member is generally increased, resulting in an increase in the centrifugal force acting on the articles being processed.

On the basis of these observations, the Applicant has first established that the production capacity of a carousel device can be increased without increasing the centrifugal force acting on the articles, by arranging the articles in a multiple-row configuration, for example by moving them on more rows substantially parallel with the advance trajectory of the transporter member. For example, the Applicant has verified that in a carousel device with a circular trajectory, the articles may be picked up in groups of two or more articles from the gripping heads and then rotated so as to align this group of articles to a radial direction, forming a plurality of two or more rows of articles that are moved along respective substantially circular and concentric trajectories.

However, the Applicant has observed that the passage of articles between carousel devices, and in particular the passage from a carousel device in which the articles are moved in a single-row configuration to a carousel device in which the articles are moved in a multiple-row configuration, may be particularly burdensome in terms of providing the driving equipment of the respective gripping heads of the carousel devices and be potentially critical for the proper handling of articles between the gripping devices.

Moreover, the Applicant has verified that this criticality increases in the event that the transport speed of the articles is particularly high, due to the reduction in the cycle times and, consequently, the reduction in the time in which the article must be transferred from one carousel device to another. However, the Applicant has perceived that the passage of the articles between the carousel devices could be significantly eased by providing that the articles were only exchanged between respective gripping heads of the carousel devices.

In other words, the gripping head of the downstream carousel device, which is intended to move the articles into the multi-row configuration, receives the articles from a single gripping head of the upstream carousel device, thus allowing the exchange to be managed in a single operation.

Finally, the Applicant has found that a movement unit for articles comprising a first carousel device provided with a plurality of first gripping heads which are mounted with an ability to move on a respective first transporter member and provided to move articles into a single-row configuration, and a second carousel device provided with a plurality of second gripping heads which are mounted with an ability to move on a respective second transporter member and provided to move the articles into a multiple-row configuration, wherein the articles are brought to each second gripping head by a single first gripping head, is capable of operating at high speeds with precise and effective driving equipment, while ensuring a correct handling of the articles, in particular in the exchange step.

Thus, in a first aspect thereof, the present invention is directed to a movement unit for articles comprising a first carousel device and a second carousel device.

Preferably, said first carousel device comprises a first transporter member which can be moved along a first advance trajectory.

Preferably, said first carousel device comprises a plurality of first gripping heads which are mounted with an ability to move on said first transporter member.

Preferably, said first gripping heads are provided to move said articles into a single-row configuration, in which said articles are in a single row during the movement thereof along said first advance trajectory.

Preferably, said second carousel device comprises a second transporter member which is movable along a second advance trajectory.

Preferably, said second carousel device comprises a plurality of second gripping heads which are mounted with an ability to move on said second transporter member.

Preferably, each second gripping head is provided to receive said articles from said first carousel device.

Preferably, each second gripping head is provided to move said articles into a multiple-row configuration, in which said articles are aligned in a plurality of rows which are staggered relative to each other during the movement thereof along said second advance trajectory.

Preferably, each second gripping head receives said articles from a respective first gripping head.

In a second aspect thereof, the present invention is directed to a method for moving articles between carousel devices.

Preferably, the method comprises the step of providing a first carousel device comprising a first transporter member which is movable along a first advance trajectory.

Preferably, said first carousel device comprises a plurality of first gripping heads which are mounted with an ability to move on said first transporter member.

Preferably, the method comprises the step of providing a second carousel device comprising a second transporter member which is movable along a second advance trajectory.

Preferably, said second carousel device comprises a plurality of second gripping heads which are mounted with an ability to move on said second transporter member.

Preferably, the method comprises the step of moving, by means of said first carousel device, said articles which are retained by said first gripping heads into a configuration with a single row, in which said articles are aligned in a single row during the movement thereof along said first advance trajectory.

Preferably, the method comprises the step of transferring said articles from said first carousel device to said second carousel device.

Preferably, said step of transferring said articles is carried out by means of passing the articles from each first gripping head to a respective second gripping head.

Preferably, the method comprises the step of moving, by means of said second carousel device, said articles received by said first gripping heads into a configuration with multiple rows, in which said articles are aligned in a plurality of rows which are staggered relative to each other during the movement thereof along said second advance trajectory.

Thanks to these features, the movement unit of the present invention is capable of transferring articles between carousel devices even at high speeds, and, at the same time, allowing the articles to be transported from a single-row configuration to a multiple-row configuration without over-complicating the driving equipment of the gripping heads of the respective carousel devices.

In a third aspect thereof, the present invention is directed to an apparatus for producing capsules for infusion type beverages, comprising at least one movement unit for capsules, wherein said capsule movement unit is constructed according to the aforesaid first aspect.

Thanks to these features, the production apparatus is particularly suitable for moving and processing capsules for infusion type beverages, especially capsules containing coffee powder that have not yet been closed, with high production capacities.

In at least one of the aforesaid aspects, the present invention may also have at least one of the preferred features set out below.

Preferably, each of said first gripping heads is provided to selectively retain a number of articles equal to the number of articles delivered to each of said second gripping heads.

In this way, the exchange between a first gripping head and a second gripping head is completed, without any articles remaining on the first gripping head.

Preferably, said articles are passed two by two from each first gripping head to a respective second gripping head.

Preferably, in said first carousel device said articles are aligned substantially parallel with said first advance trajectory.

In some embodiments, said second gripping heads are moved on said second transporter member so as to define on said second carousel device a number of rows of articles equal to the number of articles received from each second gripping head.

In this way, the number of articles accommodated in each second gripping head is equal to the number of rows on which the articles will be arranged in the second carousel device, so that the arrangement of the articles in multiple rows can be achieved by a simple movement, for example a rotation, of the second gripping heads with respect to the second transporter member. Preferably, said second gripping heads are moved on said second transporter member in such a manner that, over at least a portion of said second carousel device, each row of said plurality of rows is substantially parallel with said second advance trajectory.

In some embodiments, said first transporter member comprises a drum which rotates about a first main rotation axis and said first advance trajectory defines a circumference.

Preferably, said first main rotation axis is substantially vertical.

In some embodiments, said second first transporter member comprises a drum which rotates about a second main rotation axis and said second advance trajectory defines a circumference.

Preferably, said second main rotation axis is substantially vertical.

In this way, the carousel devices are more easily manageable both in the movement of the transporter member and in the movement of the respective gripping heads.

In some embodiments, each first gripping head comprises a plurality of gripping elements, each of which is provided to retain one of said articles individually.

In this way, the first carousel device is facilitated in taking care of the single articles and the controlled passage thereof to the second gripping heads of the second carousel device is ensured.

Preferably, said gripping elements are of the pincer type.

Preferably, said gripping elements comprise a central arm which is mounted so as to be fixed to said first gripping head and a pair of lateral arms.

Preferably, said lateral arms are mounted on said first gripping head at the opposite side with respect to said central arm and are articulated so as to pivot away from and towards said central arm in order to retain or release said articles.

In this way, a pincer gripping element is obtained with a particularly simple and effective mechanical construction capable of gripping two articles at a time and keeping them at a correct spacing relative to each other.

In other embodiments, said gripping elements are of the suction cup type, connected to a pressure reduction circuit in order to retain the articles by suction.

In some embodiments, said second gripping heads comprise a tray-like element in which a plurality of seats are formed.

Preferably, each seat is provided to receive a single article from said first gripping head in a supporting manner.

In this way, each article is individually picked up by the second gripping heads and, moreover, by retaining the articles at the bottom in a supporting manner, a gentle handling thereof is guaranteed and any operations on the articles that require free access to the top thereof, such as in the case of filling containers with a product, whether liquid or powder, are allowed.

Furthermore, the provision of a tray-like element allows the articles to be received from the first gripping heads in a comfortable, simple manner, avoiding possible mechanical interference, both in the case where the first gripping heads are provided with pincer gripping elements, which typically retain the articles by gripping them laterally at the sides, and in the case where they are provided with suction cup gripping elements, which typically retain the articles from the top.

In some embodiments, said second carousel device comprises a driving equipment of said second gripping heads which is provided to pivot each second gripping head about a pivot axis in order to move said articles into said configuration with multiple rows.

In this way, the articles can be brought into a multi-row configuration with a simple rotation movement.

Preferably, said pivot axis is spaced apart from a straight line which joins said seats of said tray-like element.

In this way, the tray-like element can be moved with respect to the transporter member for greater movements, so that it can be conveniently brought at any moving elements for processing articles, for example at a container filling dispenser.

In a preferred embodiment, said articles are moved from said first carousel device to said second carousel device at a speed greater than 500, more preferably greater than 1000 articles per minute, even more preferably exceeding 1200 articles per minute.

In a preferred embodiment, said articles are capsules for infusion type beverages, e.g. coffee.

In one embodiment, said movement unit transports empty capsules from said first carousel device to said second carousel device and, preferably, said second carousel device comprises at least one device for filling said empty capsules with a powdered product.

Preferably, said at least one filling device is mounted on said second transporter member so as to fill said empty capsules during the movement of said second transporter member along said second advance trajectory.

The characteristics and advantages of the invention will become clearer from the detailed description of an embodiment example illustrated, by way of non-limiting example, with reference to the appended drawings wherein.

Figure 1:
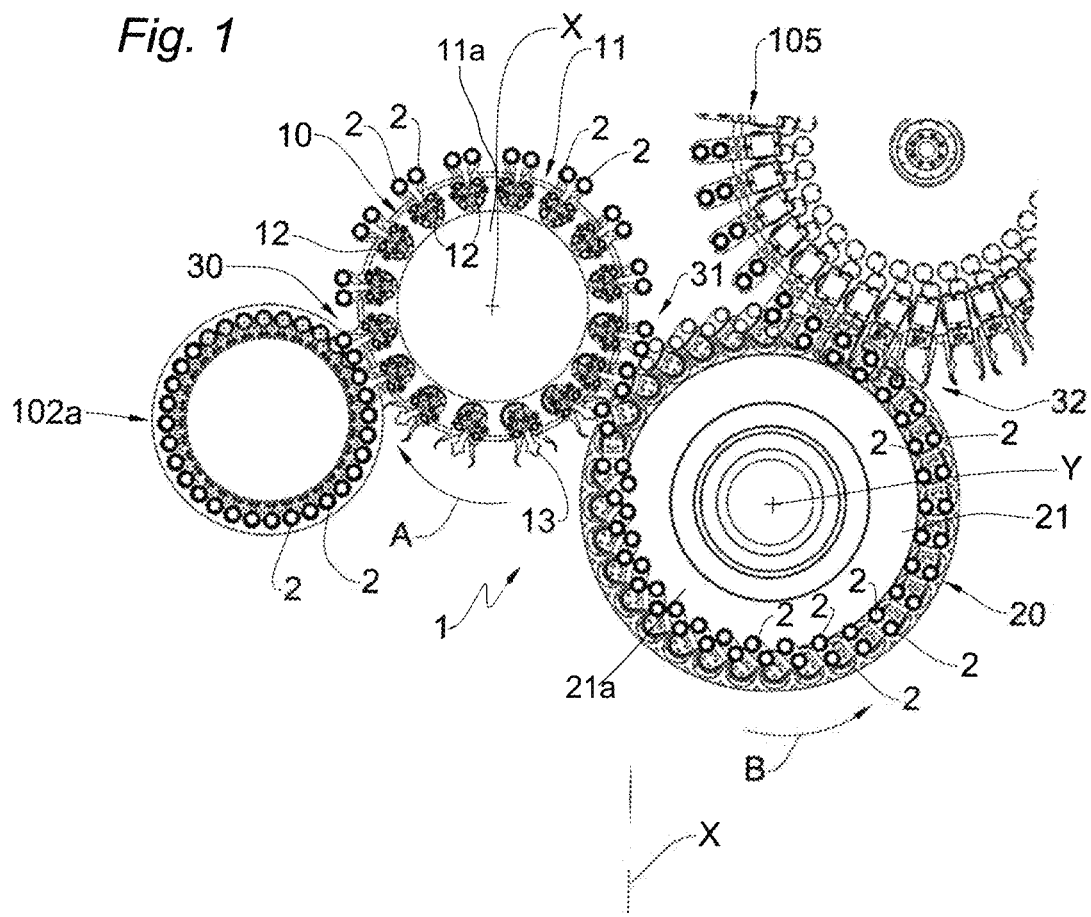
FIG. 1 is a schematic plan view from above of a movement unit for articles constructed in accordance with the present invention.
Figure 3:
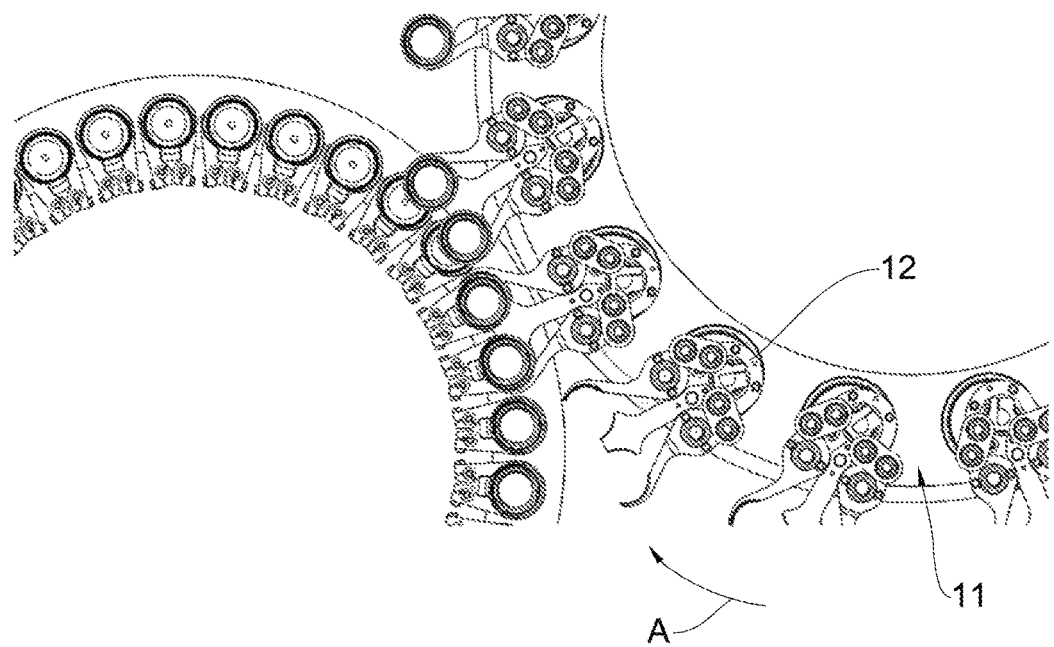
Figure 4:
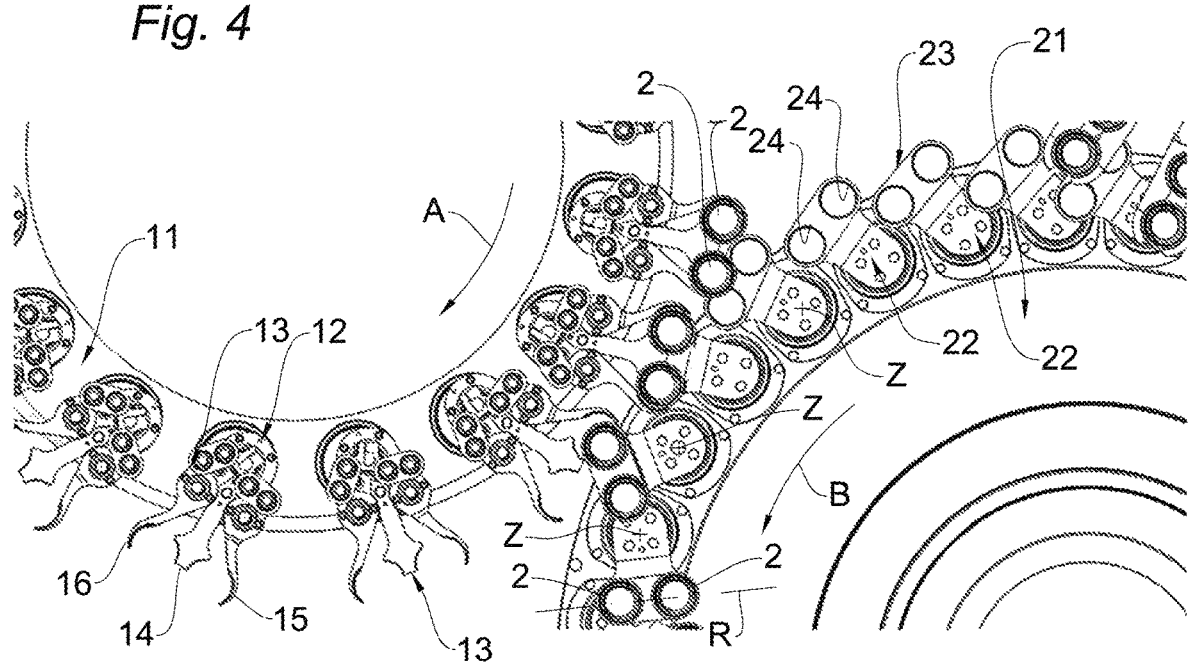
Figure 5:
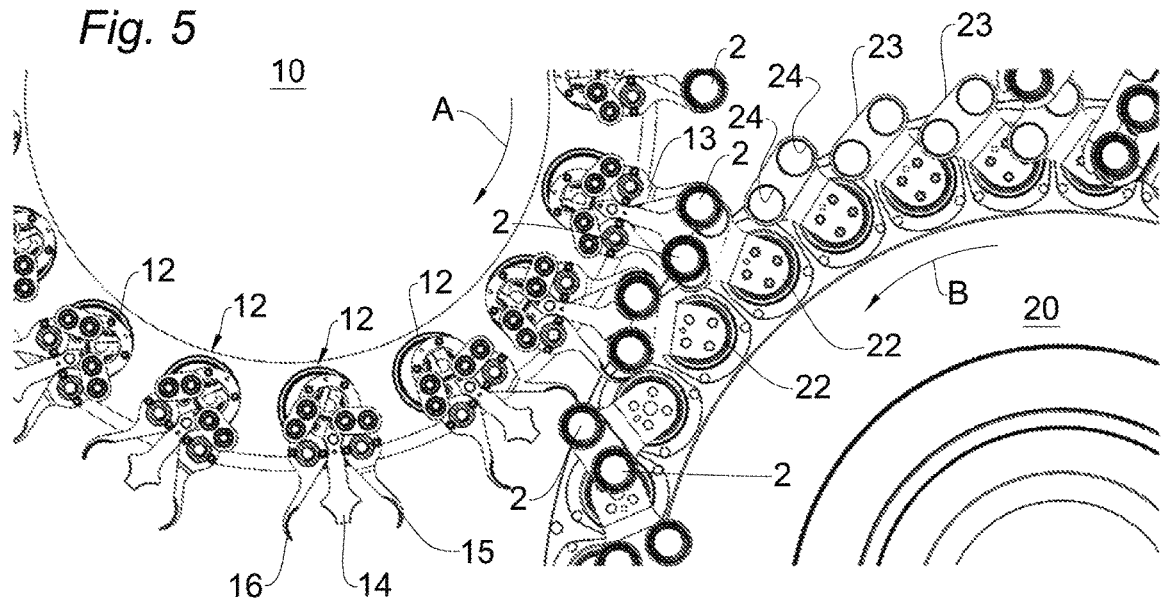
Figure 6:
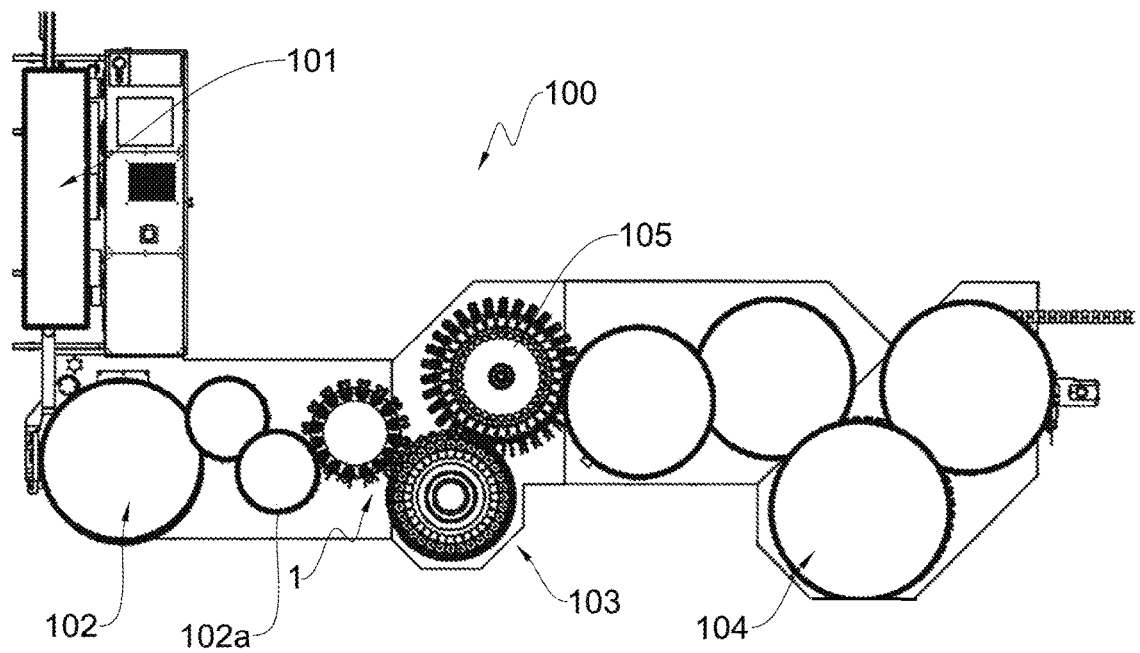

FIG. 3 is a schematic plan view from above of a detail on an enlarged scale of the movement unit in FIG. 1, FIGS. 4 and 5 are schematic plan views from above of a detail on an enlarged scale of the movement unit in FIG. 1 in subsequent operating positions, FIG. 6 is a schematic plan view from above of an apparatus for producing capsules for infusion type beverages comprising the movement unit for articles of FIG. 1.

With reference to the accompanying figures, 1 indicates overall a movement unit for articles 2 constructed in accordance with the present invention.

The movement unit 1 is inserted within an apparatus 100 for preparing and packaging capsules for infusion type beverages, in particular coffee, and is provided to continuously move a plurality of empty capsules, prior to the filling thereof with coffee powder.

In this embodiment example, therefore, the articles 2 are thus formed by capsules, also indicated below with the same numerical reference.

In general terms, the apparatus 100 comprises a first unit 101 in which the empty capsules 2 are fed, a second unit 102 in which the empty capsules 2 are coupled to a filter, a third unit 103, comprising the movement unit 1, in which the empty capsules 2 provided with a filter are filled with coffee powder, as well as a fourth unit 104 in which the coffee-filled capsules 2 are closed by a membrane.

The capsules 2 are formed by a rigid casing, with a truncated conical shape, comprising a bottom 4 from which a flared lateral wall 3 extends towards an opening 5 opposite the bottom 4. The bottom 4 has a smaller cross-section than the mouth 5 and, overall, the capsules have a diameter of between 20 and 60 mm and a height of between 15 and 60 mm.

The movement unit 1, in the most general components thereof, comprises a first carousel device 10, configured to transport the capsules 2 into a single-row configuration, and a second carousel device 20, which is provided to receive the capsules 2 from the first carousel device 10 and to transport them towards the subsequent processing unit in an arrangement with multiple rows, in particular a double row, as clearly visible in FIG. 1.

The first carousel device 10 comprises a first transporter member 11 on which the first gripping heads 12 are mounted with an ability to move.

The first transporter member 11 comprises a drum 11*a* which is driven in rotation about a first main rotation axis X, which extends along a substantially vertical direction, so as to define a first advance trajectory A of the first transporter member 11, which is substantially circular.

The first gripping heads 12 are mounted uniformly on an upper surface of the drum, at a radially outer circumferential region of the drum.

Preferably, the first gripping heads 12 are limitedly movable with respect to the first transporter member 11, and, in particular, they can be pivoted about a substantially vertical axis thereof, parallel with the first main rotation axis X. Each first gripping head 12 comprises a pair of gripping elements 13, each of which is provided to individually retain a capsule 2.

In particular, the gripping elements 13 are of the pincer type and comprise a central arm 14, which is mounted so as to be fixed to the first gripping head 12, and a pair of lateral arms 15 and 16, which are mounted on the first gripping head 12 at the opposite side with respect to the central arm 14 and are articulated so as to pivot away from and towards the central arm 14 in order to retain or release the capsules 2.

The second carousel device 20 comprises a second transporter member 21 on which the second gripping heads 22 are mounted with an ability to move.

The second transporter member 21 comprises a drum 21*a* which is driven in rotation about a second main rotation axis Y, which extends along a substantially vertical direction, so as to define a second advance trajectory B of the second transporter member 21, which is substantially circular.

The second gripping heads 22 are mounted uniformly on an upper surface of the drum, at a radially outer circumferential region of the drum.

Each second gripping head 22 further comprises a tray-like element 23, in which a pair of seats 24 is formed, each provided to receive a single capsule 2 from a first gripping head 12 in a supporting manner.

The second gripping heads 22 are limitedly movable with respect to the second transporter member 21, and, in particular, the second carousel device 20 comprises a driving equipment 22*a* of the second gripping heads 22 which is provided to pivot each of them about a substantially vertical pivot axis Z, parallel with the second main rotation axis Y.

Preferably, the pivot axis Z is spaced apart from a straight line R which joins the seats 24 of the tray-like element 23.

A filling device (not shown in the accompanying Figures) is also mounted on the second carousel device 20, which is provided to fill the capsules 2 with coffee powder while they are moved along the second advance trajectory B. The movement unit 1 operates as follows.

The first carousel device 10 removes the capsules 2 from a wheel 102*a* of the second unit 102 of the apparatus 110, in which the capsules are joined to a filter.

In particular, the first carousel device 10 removes the capsules 2 at a removal zone 30, in which the first advance trajectory A approaches or overlaps the trajectory of the wheel 102*a*.

At the removal zone 30, the first gripping heads 12 are rotated with respect to the transporter member 11 about their respective pivot axes, so as to bring the gripping elements 13 close to the capsules 2 and keep them facing them for a sufficient portion to allow the lateral arms 15 and 16 to approach the central arm 14 and to close around the capsules 2 to be removed (FIG. 3). After the removal, the capsules 2 are moved in pairs from the first gripping heads 12 towards an exchange zone 31, defined in a proximity region of the first transporter member 11 and of the second transporter member 21, where they are delivered from the first carousel device 10 to the second carousel device 20.

During the movement between the removal zone 30 and the exchange zone 31, the position of the first gripping heads 12 is maintained in such a manner that the capsules 2 moved by the first transporter 11 assume a single-row configuration, substantially circular, parallel with the first advance trajectory A.

At the exchange zone 31, the first gripping heads 12 and the second gripping heads 22 are pivoted about their respective pivot axes in such a manner that the tray-like elements 23 are positioned under the capsules 2 transported by the gripping elements 13 so as to be able to receive them in the seats 24 and allow the immediate disengagement of the gripping elements 13 which is carried out by moving the lateral arms 15 and 16 away from the central arm 14 (better visible in FIGS. 4 and 5).

Figure 2:
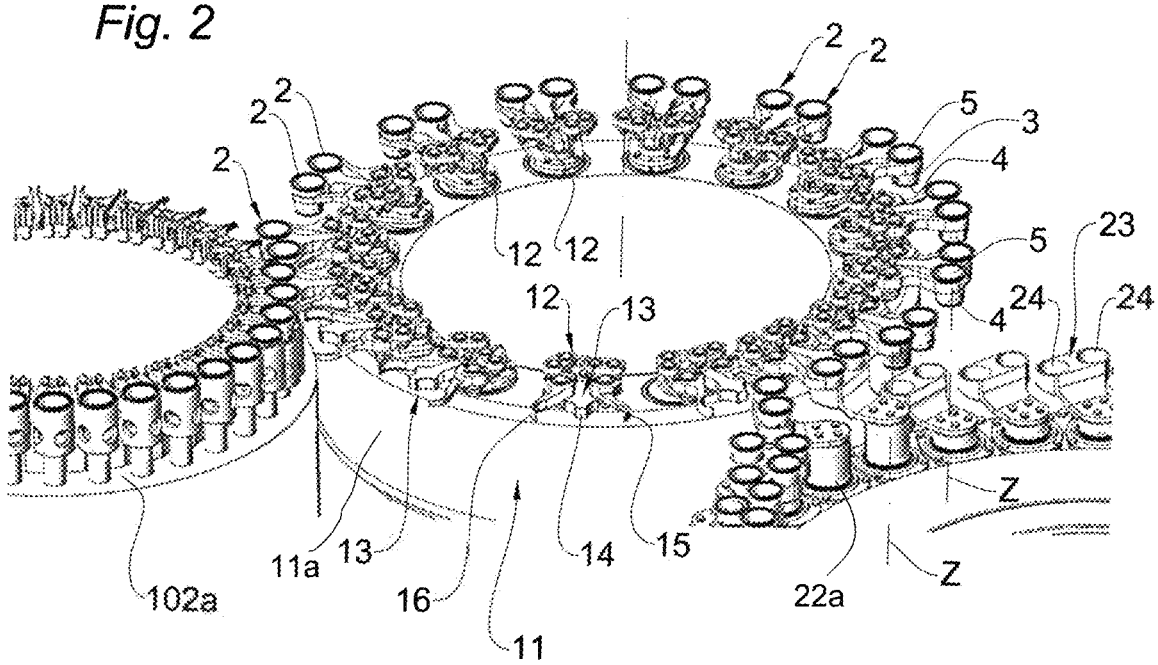
FIG. 2 is a schematic front view of the movement unit in FIG. 1.

In particular, as better visible in FIG. 2, the second gripping heads 22 while they are pivoting about the pivot axis Z, are also moved upwards, along the direction defined by such axis, so as to engage the bottom 4 of the capsules 2 in the seats 24. Each pair of capsules 2 thus passes simultaneously from a first gripping head 12 to a second gripping head 22.

The passage of the capsules 2 from the first carousel device 10 to the second carousel device 20 therefore takes place by successive passages of pairs of capsules 2 from a first gripping head 12 to a respective second gripping head 22.

As the capsules 2 are released from the gripping elements 13, the second gripping heads 22 are again lowered and rotated about the pivot axis Z to move the capsules 2 into a configuration with multiple rows, in this case a double row.

During the movement of the second transporter member 21 along the second trajectory B, the capsules 2 carried by the second gripping heads 22 are filled with coffee powder thanks to the action of the filling device provided on the second carousel device 20.

In the final portion of the movement of the second transporter member 21 along the second trajectory B, the capsules 2 are finally moved by the second gripping heads 22 in such a manner that each pair of capsules carried by a second gripping head is aligned according to a radial direction of the transporter member 21. In this way, on the final segment of the second carousel device 20, two rows of capsules 2 remain defined substantially parallel with the second advance trajectory B (better visible in FIG. 1).

The pairs of capsules 2 are then delivered by the second carousel device 20 to a subsequent transport device, for example an exchange wheel 105 at a release zone 32.

Thanks to the features of the present invention, it is therefore possible to transfer the capsules 2 between the first carousel device 10, where they are arranged in a single-row configuration, and the second carousel device 20, where they are arranged in a multiple-row configuration, effectively and safely even at high production speeds, in particular even at speeds of about 1500 articles per minute.

It goes without saying that a person skilled in the art may, in order to meet specific and contingent application requirements, make further modifications and variants of the above-described invention within the scope of protection as defined by the following claims.

The invention claimed is:

1. A movement unit for articles, comprising:
   a first carousel device comprising:
      a first transporter member moveable along a first advance trajectory, and
      first gripping heads comprising gripping elements, said gripping elements comprising
         a central arm connected to each one of said first gripping heads and
         two lateral arms mounted on each one of said first gripping heads at an opposite side with respect to said central arm and articulated to pivot away from and towards said central arm in order to retain or release said articles,
      said first gripping heads moveably mounted on said first transporter member, said first gripping heads configured to move said articles into a single-row configuration, in which said articles are aligned in a single row during movement of said articles along said first advance trajectory; and
   a second carousel device comprising:
      a second transporter member moveable along a second advance trajectory, and
      second gripping heads moveably mounted on said second transporter member, each second gripping head being configured to receive said articles from said first carousel device and to move said articles into a multiple-row configuration, in which said articles are aligned in a plurality of rows staggered relative to each other during movement of the articles along said second advance trajectory,
   wherein:
      each lateral arm, when pivoted toward the central arm, is configured to retain one article between each lateral arm and the central arm, and
      each second gripping head is configured to receive said articles from a respective first gripping head.

2. The movement unit according to claim 1, wherein said second gripping heads are configured to be moved on said second transporter member to define on said second carousel device a number of rows of articles equal to a number of articles received from each second gripping head.

3. The movement unit according to claim 2, wherein said second gripping heads are configured to be moved on said second transporter member in such a manner that, over at least a portion of said second carousel device, each row of said plurality of rows is substantially parallel with said second advance trajectory.

4. The movement unit according to claim 1, wherein:
   said first transporter member comprises a drum configured to rotate about a first main rotation axis, and
   said first advance trajectory defines a circumference.

5. The movement unit according to claim 4, wherein said first main rotation axis is substantially vertical.

6. The movement unit according to claim 1, wherein:
   said second transporter member comprises a drum configured to rotate about a second main rotation axis, and
   said second advance trajectory defines a circumference.

7. The movement unit according to claim 6, wherein said second main rotation axis is substantially vertical.

8. The movement unit according to claim 1, wherein each said second gripping head comprises a tray-like element having a plurality of seats, each seat being configured to receive a single article from a corresponding first gripping head.

9. The movement unit according to claim 1, wherein said second carousel device comprises:
   a driving equipment of said second gripping heads, configured to pivot each second gripping head about a pivot axis in order to move said articles into said configuration with multiple rows.

10. The movement unit according to claim 9, wherein:
   each said second gripping head comprises a tray-like element having a plurality of seats, each seat being configured to receive a single article from a corresponding first gripping head; and
   said pivot axis is spaced apart from a straight line which joins said seats of said tray-like element.

11. A method for moving articles between carousel devices, comprising:
   providing a first carousel device comprising: a first transporter member moveable along a first advance trajectory, and first gripping heads moveably mounted on said first transporter member;
   providing a second carousel device comprising: a second transporter member moveable along a second advance trajectory, and second gripping heads moveably mounted on said second transporter member;
   moving, by said first carousel device, said articles retained by said first gripping heads into a configuration with a single row, in which said articles are aligned in a single row during movement of said articles along said first advance trajectory;
   transferring said articles from said first carousel device to said second carousel device by passing the articles from each first gripping head to a respective second gripping head;

moving, by said second carousel device, said articles received from said first gripping heads into a configuration with multiple rows, in which said articles are aligned in a plurality of rows staggered relative to each other during movement of the articles along said second advance trajectory; and filling said articles during movement of the articles along the second advance trajectory.

12. The method according to claim 11, wherein said articles are passed two by two from said each first gripping head to said respective second gripping head.

13. An apparatus for producing capsules for infusion type beverages, the apparatus comprising a unit comprising at least one movement unit, the at least one movement unit comprising:

a first carousel device comprising:
a first transporter member moveable along a first advance trajectory, and
first gripping heads moveably mounted on said first transporter member, said first gripping heads configured to move said articles into a single-row configuration, in which said articles are aligned in a single row during movement of said articles along said first advance trajectory; and a second carousel device comprising:
a second transporter member moveable along a second advance trajectory, and
second gripping heads moveably mounted on said second transporter member, each second gripping head being configured to receive said articles from said first carousel device and to move said articles into a multiple-row configuration, in which said articles are aligned in a plurality of rows staggered relative to each other during movement of the articles along said second advance trajectory, wherein:
each second gripping head is configured to receive said articles from a respective first gripping head,
said at least one movement unit is configured to transport empty capsules from said first carousel device to said second carousel device, and
in said unit, said empty capsules are configured to be filled with a powdered product.

14. The apparatus according to claim 13, wherein said empty capsules are configured to be filled during movement of said second transporter member along said second advance trajectory.

15. The movement unit according to claim 1, wherein each one of said two lateral arms comprises an end region curved toward the central arm.

16. The movement unit according to claim 1, wherein the central arm comprises an end region with two opposed recesses.

* * * * *